(12) United States Patent
Nakamura

(10) Patent No.: US 12,212,139 B2
(45) Date of Patent: Jan. 28, 2025

(54) POWER MANAGEMENT APPARATUS AND POWER MANAGEMENT METHOD

(71) Applicant: TOYOTA JIDOSHA KABUSHIKI KAISHA, Toyota (JP)

(72) Inventor: Toru Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 414 days.

(21) Appl. No.: 17/568,253

(22) Filed: Jan. 4, 2022

(65) Prior Publication Data

US 2022/0239101 A1 Jul. 28, 2022

(30) Foreign Application Priority Data

Jan. 28, 2021 (JP) .................................. 2021-011920

(51) Int. Cl.
*H02J 3/14* (2006.01)
*H02J 3/46* (2006.01)
*H02J 7/00* (2006.01)

(52) U.S. Cl.
CPC ................ *H02J 3/144* (2020.01); *H02J 3/46* (2013.01); *H02J 7/00034* (2020.01)

(58) Field of Classification Search
CPC ........... H02J 3/144; H02J 3/46; H02J 7/00034
See application file for complete search history.

(56) References Cited

U.S. PATENT DOCUMENTS

| 2009/0222143 | A1 | 9/2009 | Kempton |
| 2011/0202192 | A1 | 8/2011 | Kempton |
| 2014/0277769 | A1* | 9/2014 | Matsuoka ............. G06Q 50/06 700/278 |
| 2014/0278687 | A1* | 9/2014 | McConky ........ G06Q 10/06312 705/7.22 |
| 2015/0012149 | A1* | 1/2015 | Behrangrad ...... H02J 13/00004 700/295 |
| 2016/0280089 | A1* | 9/2016 | Uyeki .................... B60L 53/63 |
| 2017/0207633 | A1 | 7/2017 | Nakayama et al. |
| 2021/0359542 | A1 | 11/2021 | Matsumoto et al. |

FOREIGN PATENT DOCUMENTS

| JP | 2017-130183 A | 7/2017 |
| JP | 2020-018103 A | 1/2020 |
| JP | 2020-036503 A | 3/2020 |
| WO | WO 2020/158592 A1 | 8/2020 |

\* cited by examiner

*Primary Examiner* — Zhipeng Wang
(74) *Attorney, Agent, or Firm* — Finnegan, Henderson, Farabow, Garrett and Dunner, LLP

(57) ABSTRACT

In a server, an acquisition unit obtains, from a vehicle through a communication apparatus, history information indicating that demand and supply of electric power has been performed for a power grid PG, and information on the state of charge of a battery. A control unit determines priorities of a plurality of DERs for a DR request. The control unit determines a priority of the vehicle so that the vehicle is less likely to be selected for the DR request, when the SOC obtained by the acquisition unit has changed although the acquisition unit has not received the history information.

10 Claims, 11 Drawing Sheets

FIG.3

TRANSMISSION TIMING:
WHEN TRAVEL SYSTEM IS ACTIVATED/DEACTIVATED

| TRAVEL START TIME | MMDDhhmm |
|---|---|
| TRAVEL END TIME | MMDDhhmm |
| GPS LOCATION INFORMATION | ******** |
| TOTAL TRAVEL DISTANCE | ******km |
| SOC | **% |

FIG.4

TRANSMISSION TIMING:
WHEN EVENT, OTHER THAN TRAVELING, OCCURS

| EVENT TYPE | START CHARGING |
|---|---|
| TIME OF OCCURRENCE | MMDDhhmm |
| GPS LOCATION INFORMATION | ******** |
| SOC | **% |
| AVAILABLE TIME PERIOD FOR EXTERNAL ELECTRIC POWER SUPPLY | hh |
| REMAINING CHARGING TIME | hh |
| REMAINING EV TRAVEL DISTANCE | ***km |
| TOTAL TRAVEL DISTANCE | ***km |
| CHARGER-DISCHARGER STATE INFORMATION | CHARGING |

FIG.5

| UID | *** |
|---|---|
| STATE OF VEHICLE | AVAILABLE FOR DR |
| SOC | **% |
| COMMUNICATION RELIABILITY | LOW |

FIG.6

| PRIORITY | |
|---|---|
| FIRST PRIORITY | UID - *** |
| SECOND PRIORITY | UID - *** |
| THIRD PRIORITY | UID - *** |
| ⋮ | ⋮ |

POWER MANAGEMENT APPARATUS AND POWER MANAGEMENT METHOD

This nonprovisional application is based on Japanese Patent Application No. 2021-011920 filed on Jan. 28, 2021 with the Japan Patent Office, the entire content of which is hereby incorporated by reference.

BACKGROUND

Field

The present disclosure relates to a power management apparatus and a power management method, and, more particularly, to a power management apparatus and a power management method for managing demand response which requests multiple power adjustment resources electrically connectable to a power network to adjust supply and demand of electric power for the power network.

Description of the Background Art

For the power management apparatus and power management method as mentioned above, WO 2020/158592 discloses a server device selecting, using information on the reliability of electric power customers, a customer to be requested for a demand response (referred to as "DR" below). As used herein, the information on the reliability of a customer refers to a rate of achievement to a DR request (a percentage of the amount of electric power achieved during a DR request period to a requested amount of electric power) or a stay rate to a DR request (a rate per unit time of a period of time in which the amount of electric power responded to a DR request falls within a predetermined range (for example, plus or minus 20%) of a requested amount of electric power).

It is considered to actively use vehicles that have batteries mounted thereon, as power adjustment resources that can participate in DR. When a vehicle, participating in a DR, and a power management apparatus (server), managing the DR, exchange various information over wireless communications, the power management apparatus cannot appropriately obtain the information for use in DR from the vehicle if the communication condition is poor. As a result, appropriate adjustment of supply and demand of electric power may not be performed in response to the DR request. If appropriate adjustment of supply and demand of electric power is not performed in response to the DR request while the vehicle is participating in DR, a customer may suffer from drawbacks, such as being subjected to penalty.

SUMMARY

The present disclosure is made in view of the problem above, and an object of the present disclosure is to provide a power management apparatus and a power management method that can reduce drawbacks for a customer caused by appropriate adjustment of supply and demand of electric power not being performed in response to a DR request.

A power management apparatus according to the present disclosure is a power management apparatus for managing a DR which requests a plurality of power adjustment resources, electrically connectable to a power network, to perform adjustment of supply and demand of electric power for the power network. The plurality of power adjustment resources include a vehicle on which a battery is mounted. The power management apparatus includes: a communication apparatus that wirelessly communicates with the vehicle; an acquisition unit; and a control unit. The acquisition unit obtains, from the vehicle through the communication apparatus, history information indicating that the demand and supply of electric power has been performed for the power network, and information on a state of charge of the battery. The control unit determines priorities of the plurality of power adjustment resources for a request for the DR. When the acquisition unit has not obtained the history information even though the state of charge, obtained by the acquisition unit, has changed, the control unit determines a priority of the vehicle so that the vehicle is less likely to be selected for the request for the DR.

A power management method according to the present disclosure is a power management method for managing a DR which requests a plurality of power adjustment resources, electrically connectable to a power network, to perform adjustment of supply and demand of electric power for the power network. The plurality of power adjustment resources include a vehicle on which a battery is mounted. The power management method includes: wirelessly transmitting, from the vehicle to a server, history information indicating that the demand and supply of electric power has been performed for the power network; wirelessly transmitting, from the vehicle to the server, information on a state of charge of the battery; and determining priorities of the plurality of power adjustment resources for a request for the demand response. Determining the priorities includes determining a priority of the vehicle so that the vehicle is less likely to be selected for the request for the DR, when the server has not obtained the history information even though the state of charge of the battery, obtained by the server, has changed.

In the power management apparatus and power management method above, if the acquisition unit has not obtained the history information from the vehicle even though the state of charge of the battery has changed, the reliability of wireless communications between the power management apparatus and the vehicle is considered as being degraded, and the priority of the vehicle is determined so that the vehicle is less likely to be selected for a DR request. This can avoid a situation in which, despite the fact that the vehicle is participating in DR, no appropriate adjustment of supply and demand of electric power is performed in response to a DR request due to the degradation of the communication reliability. Therefore, according to the power management apparatus and the power management method, a customer can be prevented from suffering from drawbacks (such as being subjected to penalty) caused by appropriate adjustment of supply and demand of electric power not being performed in response to a DR request.

The history information may include information indicating at least one of start and end of changing of the battery from the power network.

The history information may include information indicating at least one of start and end of discharging of electric power from the battery to the power network.

The history information may include information indicating at least one of electrical connection and electrical disconnection between the power network and the vehicle.

If the history information as the above is not obtained from the vehicle, the communication reliability with the vehicle is considered as being degraded. Consequently, even though the state of charge of the battery of the vehicle has changed, the priority of the vehicle is determined so that the vehicle is less likely to be selected for the DR request. Accordingly, a customer can be prevented from suffering from drawbacks caused by appropriate adjustment of supply and demand of electric power not being performed in response to a DR request due to the degradation of the communication reliability.

A change in the state of charge of the battery may be a change since deactivation of a travel system of the vehicle until activation of the travel system of the vehicle.

The acquisition unit further may obtain location information of the vehicle from the vehicle. A change in the state of charge of the battery may be a change when the location information of the vehicle is constant.

The acquisition unit may further obtain a travel distance of the vehicle from the vehicle. A change in the state of charge of the battery may be a change when the travel distance of the vehicle is constant.

Such a change in the state of charge of the battery as the above is a change in the state of charge while the vehicle is being parked, and can indicate that the demand and supply of electric power has been performed for the power network. However, if the acquisition unit has not obtained the history information on demand and supply of electric power, the communication reliability is considered as being degraded, and the priority of the vehicle is determined so that the vehicle is less likely to be selected for the DR request the vehicle. Accordingly, a customer can be prevented from suffering from drawbacks caused by appropriate adjustment of supply and demand of electric power not being performed in response to a DR request due to the degradation of the communication reliability.

When an amount of change in the state of charge of the battery, obtained by the acquisition unit, exceeds a threshold and the acquisition unit has not obtained the history information, the control unit may determine the priority of the vehicle so that the vehicle is less likely to be selected for the request for the DR.

Since demand and supply of electric power is not performed for the power network while the vehicle is traveling, no history information is obtained. On the other hand, the state of charge of the battery is changed by the vehicle traveling. Thus, a change in the state of charge while the vehicle is traveling may end up determining the priority of the vehicle so that the vehicle is less likely to be selected for the DR request. Thus, as described above, if a change in state of charge is greater than the threshold, the priority of the vehicle is determined so that the vehicle is less likely to be selected for the DR request, thereby preventing the priority of the vehicle from being unnecessary lowered. It should be noted that, since an average amount of change in state of charge when demand and supply of electric power is performed for the power network is considered as being greater than average amount of change in state of charge while the vehicle is traveling (because electric power is discharged and charged while the vehicle is traveling), the threshold is appropriately set to a value that allows average amounts of change in the SOCs in the above two cases to be distinguishable, for example.

The history information may include information indicating that the battery has been charged from the power network. When the acquisition unit has not obtained the history information even though the state of charge, obtained by the acquisition unit, has risen, the control unit may determine the priority of the vehicle so that the vehicle is less likely to be selected for the request for the DR.

This can avoid a situation in which, despite the fact that the vehicle is participating in DR, the vehicle does not perform appropriate charging (electric power demand) in response to a DR request due to the degradation of the communication reliability. Accordingly, a customer can be prevented from suffering from drawbacks caused by charging of the battery not being performed in response to a DR request.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a diagram illustrating one example of information transmitted from the vehicle to a server.

FIG. 4 is a diagram illustrating one example of information transmitted from the vehicle to the server.

FIG. 5 is a diagram illustrating one example of DR information that is managed for each vehicle at the server.

FIG. 6 is a diagram illustrating one example of priority information for a DR request.

DESCRIPTION OF THE PREFERRED EMBODIMENTS

Hereinafter, embodiments according to the present disclosure will be described, with reference to the accompanying drawings. Note that the same reference signs are used to refer to the same or like parts, and the description thereof will not be repeated.

Figure 1:
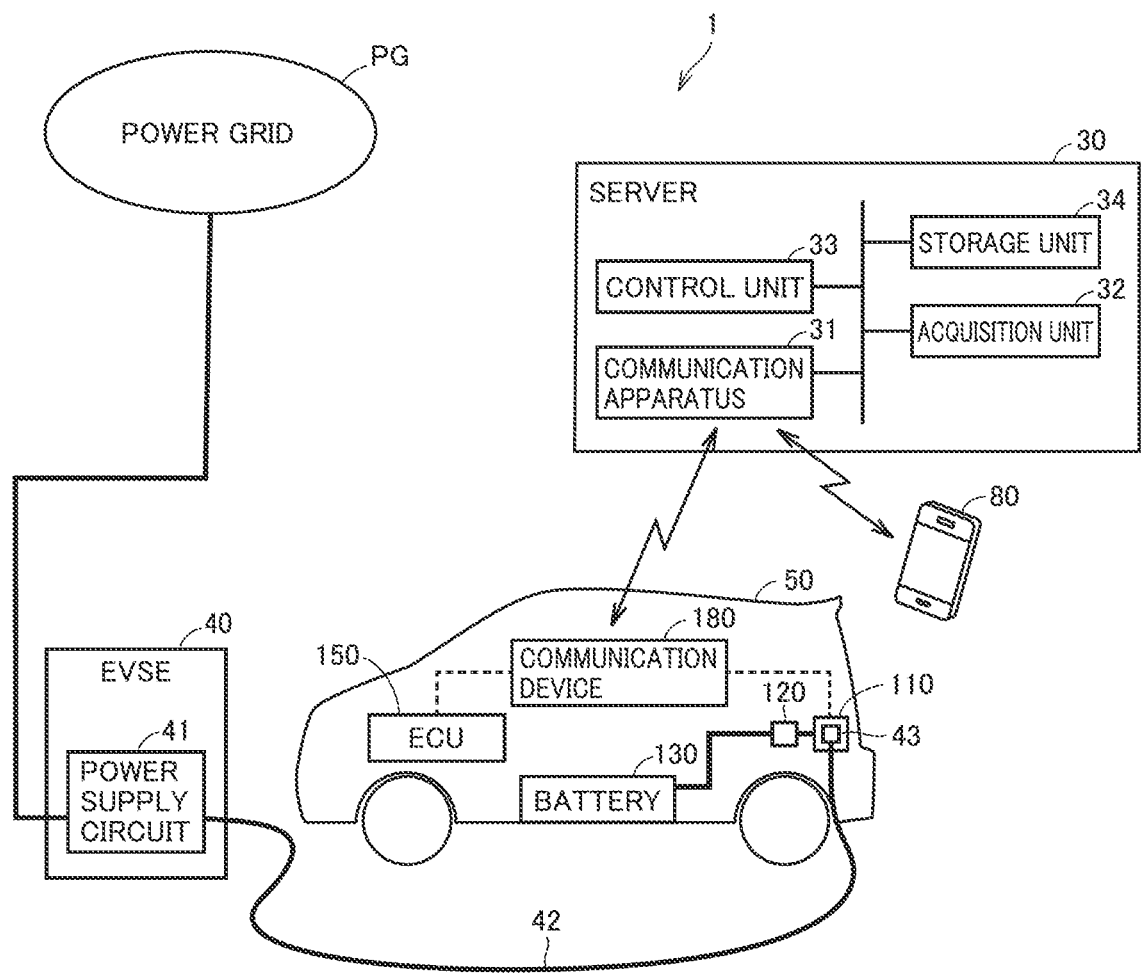
FIG. 1 is a diagram showing a configuration of a power management system which includes a power management apparatus according to an embodiment of the present disclosure.

FIG. 1 is a diagram showing a configuration of a power management system which includes a power management apparatus according to an embodiment of the present disclosure. Referring to FIG. 1, a power management system 1 includes: a power grid PG; a server 30 corresponding to a power management apparatus; an electric vehicle supply equipment (EVSE) 40; a vehicle 50; and a portable terminal 80.

The vehicle 50 includes an inlet 110, a charger-discharger 120, a battery 130, an electronic control unit (ECU) 150, and a communication device 180. The vehicle 50 is configured to transmit/receive electric power to/from the power grid PG through the inlet 110. In other words, as the vehicle 50 is electrically connected to the EVSE 40 through the inlet 110, the vehicle 50 can store electric power, which is supplied from the power grid PG, into the battery 130, or supply the power grid PG with the electric power stored in the battery 130. Note that, in the following, charging the battery 130 from the power grid PG by the EVSE 40 may be referred to as "external charging" and supplying the power grid PG with electric power stored in the battery 130 by the EVSE 40 may be referred to as "external electric power supply."

The inlet 110 is configured to be electrically connected to a connector 43 of an electric power cable 42 extending from the EVSE 40. As the connector 43 is connected to the inlet 110, the vehicle 50 can receive electric power from the power grid PG, or supply electric power to the power grid PG. While FIG. 1 shows only the inlet 110 (and the charger-discharger 120) that supports the powering scheme of the EVSE 40, it should be noted that the vehicle 50 may include multiple inlets to support multiple types of power supply schemes (for example, an AC (alternate current) power supply scheme and a DC (direct current) power supply scheme).

The charger-discharger 120 includes: a relay (not shown) which is provided on a power path between the inlet 110 and the battery 130 and switches electrical connection/disconnection of the power path; and a power converter circuit (not shown). During external charging, the charger-discharger 120 converts the electric power, input from the inlet 110, into electric power that has the voltage level of the battery 130, and outputs the electric power to the battery 130. During external electric power supply, on the other hand, the charger-discharger 120 converts the electric power discharged from the battery 130 into electric power having a voltage level appropriate for the external electric power supply, and outputs the electric power to the inlet 110. For example, the power converter circuit is configured of a bidirectional converter.

The battery 130 includes a secondary battery, such as a lithium-ion secondary battery or a nickel-metal hydride secondary battery. During external charging, the battery 130 is charged with the supply of electric power output from the charger-discharger 120. During external electric power supply, the battery 130 outputs to the charger-discharger 120 the electric power stored in the battery 130. In this way, the electric power supplied from the power grid PG (the EVSE 40) is stored in the battery 130, and the electric power stored in the battery 130 is supplied to the power grid PG (the EVSE 40), thereby allowing the vehicle 50 to function as a power adjustment resource that can respond to a DR request. The battery 130 is also capable of storing regenerative power generated by a travel motor (not shown) at the time of breaking of the vehicle.

The ECU 150 includes a processor (such as a central processing unit (CPU)), a random access memory (RAM), a read only memory (ROM), etc. (none of which are shown). The processor deploys programs stored in the ROM into the RAM, etc., and executes the programs. Various control processes performed by the ECU 150 are written in the programs stored in the ROM.

The ECU 150 performs various controls on the vehicle 50. For example, the ECU 150 performs a traveling control on the vehicle 50. The ECU 150 also performs a charging control and a discharging control on the battery 130. In particular, in accordance with a DR request received from the server 30 through the communication device 180, the ECU 150 performs the charging control and/or the discharging control on the battery 130. The ECU 150 also collects various data, such as the state of charge (SOC) of the battery 130, the location information of the vehicle 50, and the remaining EV travel distance based on the SOC, and transmits the collected various data to the server 30 through the communication device 180 at a predetermined timing (at a time of system startup/shutdown, at a time of start/end of charging and discharging, or periodically). The controls performed by the ECU 150 will be described in detail below.

The communication device 180 includes a communication interface (I/F) for wireless communications with the server 30. The ECU 150 can wirelessly communicate with the server 30 through the communication device 180. The communication device 180 may include a data communication module (DCM) or 5G enabled communication I/F.

The portable terminal 80 corresponds to a terminal carried by a user of the vehicle 50. The portable terminal 80 is configured to wirelessly communicate with the server 30. The user of the vehicle 50 can output instructions from the portable terminal 80 to the server 30 so that, for example, the server 30 can obtain the various information (such as the SOC and the remaining travel distance) of the vehicle 50. In the present embodiment, smartphone which includes a touch panel display is employed as the portable terminal 80. However, the present disclosure is not limited thereto. Any portable terminal can be employed as the portable terminal 80.

The power grid PG is a power network that is provided by an electric utility (for example, a power company). The power grid PG is electrically connected to multiple EVSEs, including the EVSE 40, and supplies AC power to the EVSEs. The EVSE 40 includes a power supply circuit 41, which converts electric power, supplied from the power grid PG, into one that is appropriate for external charging of the vehicle 50. The power supply circuit 41 may include a sensor for detecting the charging power.

As the relay included in the charger-discharger 120 is closed, the battery 130 mounted on the vehicle 50 is electrically connected to the EVSE 40. During the external charging, electric power is supplied from the power grid PG to the battery 130 via the power supply circuit 41, the electric power cable 42, the inlet 110, and the charger-discharger 120. During the external electric power supply, electric power is output from the battery 130 to the power grid PG via the charger-discharger 120, the inlet 110, the electric power cable 42, and the power supply circuit 41.

The server 30 includes a communication apparatus 31, an acquisition unit 32, a control unit 33, and a storage unit 34. The communication apparatus 31 includes a communication I/F for wireless communications with the communication device 180 included in the vehicle 50. The communication apparatus 31 also includes a communication I/F for wireless communications with the portable terminal 80.

The acquisition unit 32 obtains various information of the vehicle 50 through the communication apparatus 31. The acquisition unit 32 obtains information, for example, the SOC of the battery 130, the location information of the vehicle 50, and the remaining travel distance, etc., and stores in the storage unit 34 the information associated with identification information (ID) for each vehicle. The acquisition unit 32 also obtains, from the vehicle 50 through the communication apparatus 31, history information indicating that the vehicle 50 has carried out the demand and supply of electric power to the power grid PG, that is, history information indicating that the vehicle 50 has performed external charging or external electric power supply. The history information, for example, indicates start/end of the external charging or the external electric power supply, or that the connector 43 of the electric power cable 42 has been connected/disconnected to/from the inlet 110. The details of the information obtained by the acquisition unit 32 and when the acquisition unit 32 obtains such information will be described in detail below.

The control unit 33 includes a processor (such as a CPU), a memory (a ROM and a RAM), an I/O buffer, etc. (none of which are shown). The processor deploys programs stored in the ROM into the RAM, etc., and executes the programs. Various processes performed by the control unit 33 are written in the programs stored in the ROM. The processes performed by the control unit 33 will be described below.

The storage unit 34 is configured to store various information. The information obtained by the acquisition unit 32 from the vehicle 50 is stored in the storage unit 34, associated with the information (ID) for each vehicle. The storage unit 34 is configured of a hard disk drive (HDD) or a solid state drive (SSD), for example.

Figure 2:
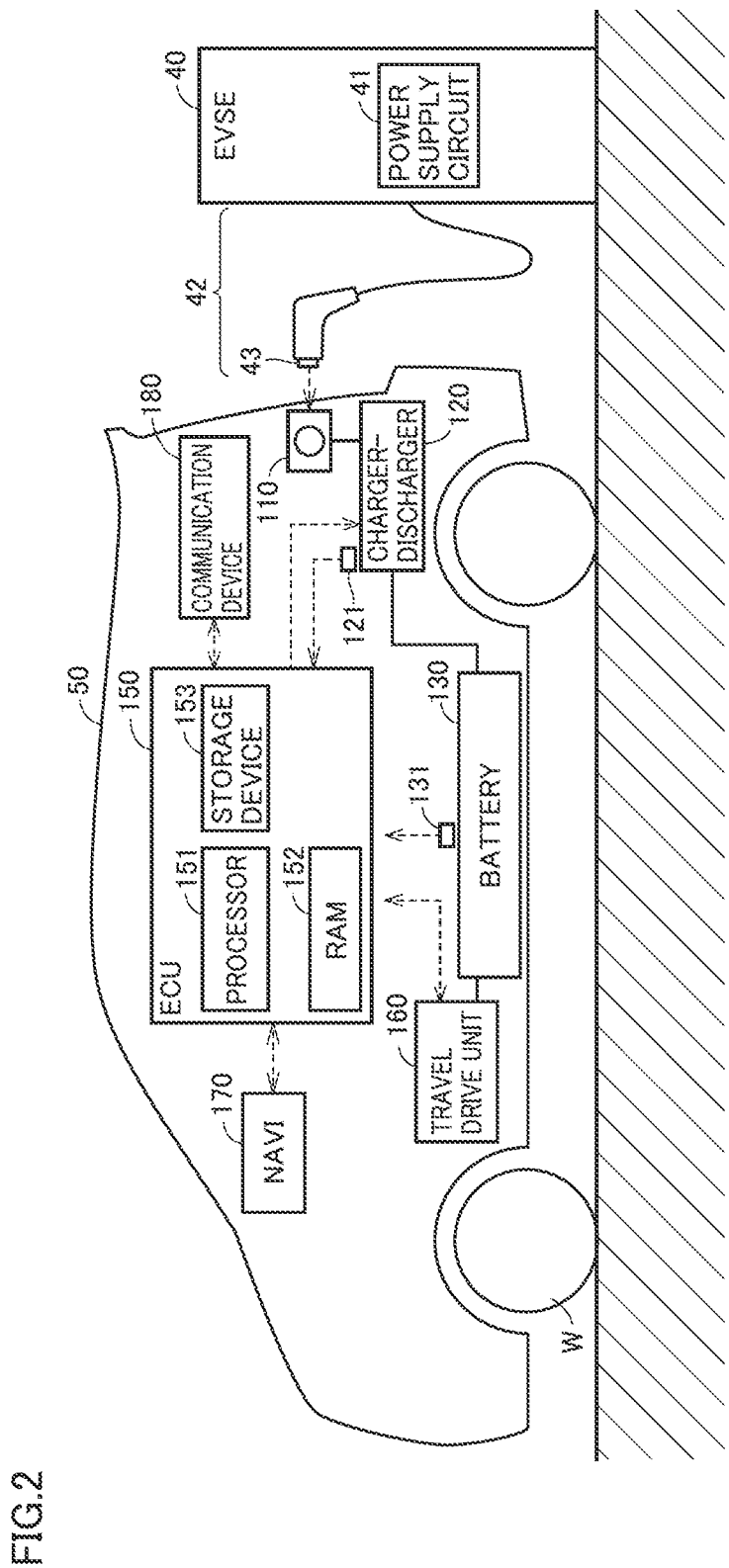
FIG. 2 is a detailed block diagram of a vehicle shown in FIG. 1.

FIG. 2 is a detailed block diagram of the vehicle 50 shown in FIG. 1. Referring to FIG. 2, besides the inlet 110, the charger-discharger 120, the battery 130, the ECU 150, and the communication device 180 described with reference to FIG. 1, the vehicle 50 further includes monitoring modules 121, 131, a travel drive unit 160, and a navigation system (referred to as a "NAVI" below) 170.

The monitoring module 121 includes various sensors for detecting conditions of the charger-discharger 120, and outputs results of the detections to the ECU 150. In the present embodiment, the monitoring module 121 is configured to detect voltage and current input to the charger-discharger 120, and voltage and current output from the charger-discharger 120.

The monitoring module 131 includes various sensors for detecting conditions of the battery 130 (for example, voltage, current, temperature, etc.), and outputs results of the detections to the ECU 150. The monitoring module 131 may be a battery management system (BMS) that further has an SOC estimation function, a state of health (SOH) estimation function, a cell voltage equalization function, a diagnosis function, etc. for the battery 130, in addition to the sensor functions above. Based on the outputs of the monitoring module 131, the ECU 150 can obtain the conditions of the battery 130.

The travel drive unit 160 includes a power control unit (PCU) and a motor generator (MG) (none of which are shown), and generates a travel driving force for the vehicle 50, using the electric power stored in the battery 130. The PCU includes, for example, an inverter and a converter (none of which are shown), and is controlled by the ECU 150. The MG is a three-phase alternating-current (AC) motor generator, for example. The MG is driven by the PCU, and configured to rotate driving wheels W. The PCU drives the MG, using the electric power supplied from the battery 130. The MG also regenerates electric power upon breaking of the vehicle, and supplies the generated electric power to the battery 130.

The NAVI 170 includes a processor, a storage device, a touch panel display, and a global positioning system (GPS) module (none of which are shown). The storage device stores map information. For example, the touch panel display receives user input and displays a map and other information, etc. The GPS module is configured to receive a signal (referred to as a "GPS signal" below) from a GPS satellite. The NAVI 170 is capable of locating the position of the vehicle 50, using the GPS signal. The NAVI 170 is configured to carry out a route search, based on the user input, to find a travel route (for example, a shortest route) from the current location of the vehicle 50 to a destination, and shows the travel route found through the route search on a map.

The ECU 150 includes a processor 151, a RAM 152, and a storage device 153. The RAM 152 functions as a working memory temporality storing data processed by the processor 151. The storage device 153 is configured to save the stored information. The storage device 153 includes, for example, a ROM and a rewritable nonvolatile memory. Besides programs, the storage device 153 stores information (maps, mathematical formulas, various parameters, etc.) which are used in the programs. Various controls at the ECU 150 are performed by the processor 151 executing the programs stored in the storage device 153.

Specifically, the ECU 150 controls the travel drive unit 160, thereby performing the traveling control on the vehicle 50. The ECU 150 also controls the charger-discharger 120, thereby performing the charging control and the discharging control on the battery 130. The ECU 150 can perform the charging control and/or the discharging control, according to a DR request received from the server 30 through the communication device 180.

The ECU 150 also calculates the SOC of the battery 130 from the voltage and current of the battery 130 which are obtained by the monitoring module 131, and outputs the SOC to the storage device 153. The ECU 150 also calculates a remaining travel distance for the vehicle 50 based on the SOC, and outputs the remaining travel distance to the storage device 153. The ECU 150 also obtains the location information of the vehicle 50 from the NAVI 170 and outputs the location information to the storage device 153.

The ECU 150 then reads the various information above from the storage device 153 at a predetermined timing, and transmits the various information to the server 30 through the communication device 180. For example, the predetermined timing is at the time of an event, such as at a time of activation/deactivation of the vehicle system (such as at on/off of a start switch, etc.), the start/end of external charging, the start/end of external electric power supply, connection/disconnection between the connector 43 of the electric power cable 42 and the inlet 110, or at a periodical timing.

Note that the various controls at the ECU 150 are not limited to be performed by software, and can be performed by dedicated hardware (electronic circuit).

FIGS. 3 and 4 are diagrams illustrating one example of information which is transmitted from the vehicle 50 to the server 30. FIG. 3 shows one example of the information that is transmitted from the vehicle 50 to the server 30 at the activation/deactivation of the travel system. Referring to FIG. 3, as a driver operates the start switch (not shown) and the travel system of the vehicle 50 is activated, the ECU 150 included in the vehicle 50 reads, from the storage device 153, "travel start time" indicative of the time when the travel system of the vehicle 50 is activated, and information, such as "GPS location information," "total travel distance," and "SOC," and transmits the "travel start time" and the information to the server 30 through the communication device 180. Note that the GPS location information is information on the current location of the vehicle 50 obtained by the NAVI 170. The total travel distance is a total distance traveled by the vehicle 50 up to the present time. The SOC is the current SOC of the battery 130.

As the start switch is operated by the driver and the travel system of the vehicle 50 is deactivated, the ECU 150 reads from the storage device 153 a "travel end time" indicative of the time when the travel system of the vehicle 50 is deactivated, and information, such as the "GPS location information," the "total travel distance," the "SOC," and transmits the "travel end time" and the information to the server 30 through the communication device 180.

FIG. 4 shows one example of the information which is transmitted from the vehicle 50 to the server 30 at the time of an event irrelevant to the vehicle travel. Referring to FIG. 4, "event type" indicates an event for which the information is transmitted to the server 30, indicating that the event is external charging in this example. As the external charging starts, the ECU 150 reads from the storage device 153 the "event type," and information, such as "time of occurrence" of the event, "GPS location information," "SOC," "available time period for external electric power supply," a "remaining charging time," "remaining EV travel distance," and "charger-discharger state information," and transmits the "event type," and the information to the server 30 through the communication device 180. Alternatively, the ECU 150 may collect the information above separately from the "event type."

Note that the available time period for external electric power supply is a time remained during external electric power supply until the battery 130 becomes empty, and calculated based on the SOC and the magnitude of electric power supplied by the vehicle 50. The remaining charging time is a time remained during external charging until the battery 130 is fully charged, and calculated based on the SOC and the magnitude of the charging power. The remaining EV travel distance is a distance that the vehicle 50 can travel with the electric power stored in the battery 130, and calculated based on the SOC and the power consumption efficiency of the vehicle 50 (for example, a historic average value, etc.). The charger-discharger state information indicates a state of the charger-discharger 120 (activated/deactivated).

Referring, again, to FIG. 1, the server 30 carries out DR to the vehicle 50. Schematically, for example, if a server (not shown) of the power company managing the power grid PG requests the server 30 to adjust supply and demand, the server 30 determines the power capacity that the vehicle 50 can offer. Based on the capacity, the server 30 generates an implementation schedule for the vehicle 50, and transmits a DR request to the vehicle 50 through the communication apparatus 31.

As the vehicle 50 receives the DR request from the server 30 and is connected to the EVSE 40, the vehicle 50 can charge the battery 130 (the external charging) with supply of electric power from the EVSE 40 (the power grid PG) or supply the EVSE 40 (the power grid PG) with the electric power stored in the battery 130 (the external electric power supply), according to the DR request. As the external charging or the external electric power supply is performed, the vehicle 50 transmits the information, shown in FIG. 4, to the server 30 through the communication device 180 at the occurrence of a respective event (for example, at start/end of external charging).

At this time, if the wireless communication between the vehicle 50 and the server 30 is poor, the server 30 is unable to appropriately obtain from the vehicle 50 the information for use in the DR. As a result, appropriate adjustment of supply and demand of electric power may not be performed in response to the DR request. If appropriate adjustment of supply and demand of electric power is not performed in response to the DR request while the vehicle is participating in DR, the user of the vehicle 50 may suffer from drawbacks, such as being subjected to penalty.

Thus, in the present embodiment, if the wireless communication between the vehicle 50 participating in DR and the server 30 is determined to be poor, the priority of the vehicle 50 is lowered among power adjustment resources (referred to as "distributed energy resources (DERs)" below) participating in DR.

In other words, while DERs are requested for DR, the priority of each of DERs participating in DR is determined, considering response situations (a time when the DER is available, charging capability/electric power supply capability, etc.). In the present embodiment, despite the fact that the changes in SOC of the vehicle 50 are sensed, if the server 30 has not obtained the history information indicating that the vehicle 50 has performed external charging or external electric power supply from the vehicle 50, the server 30 determines that the reliability of the communication with the vehicle 50 is degraded, and determines the priority of the vehicle 50 so that the vehicle 50 is less likely to be selected for a DR request.

This can avoid a situation in which, despite the fact that the vehicle 50 is participating in DR, no appropriate adjustment of supply and demand of electric power is performed in response to a DR request due to the degradation of the communication reliability. Accordingly, a customer (the user of the vehicle 50) can be prevented from suffering from drawbacks (such as being subjected to penalty) caused by appropriate adjustment of supply and demand of electric power not being performed in response to a DR request.

In the present embodiment, for each vehicle participating in and registered in DR, the server 30 manages information (referred to as "DR information" below) for determining the priority of the vehicle for DR. Based on the DR information of each vehicle participating in DR, the server 30 determines the priority of the vehicle 50 for a DR request.

FIG. 5 is a diagram illustrating one example of the DR information managed for each vehicle by the server 30. Referring to FIG. 5, "UID" is identification information (ID) of the vehicle 50, which is given to each vehicle when the vehicle is registered in participation in DR. "State of vehicle" indicates whether the vehicle 50 is available for a DR request by being connected to the EVSE 40. The information is determined based on the activation/deactivation state of the travel system of the vehicle 50 and the location information, which are obtained from the vehicle 50. The "state of vehicle" changes to available for DR when the travel system of the vehicle 50 is deactivated and the location information of the vehicle 50 indicates a location near the EVSE 40 (for example, home).

"SOC" is a most-recent SOC obtained from the vehicle 50. The DR request includes an increase demand request (also referred to as a "posiwatt DR" below) requesting an increase in electric power demand from an electric power customer (the vehicle 50), and a reduce demand request (also referred to as a "negawatt DR" below) requesting a reduction in electric power demand. Note that the negawatt DR is not limited to reduction in electric power demand, and also includes supply of electric power to the power grid PG. The lower the SOC of the vehicle 50 is, the highly available the vehicle 50 is for a posiwatt DR. The higher the SOC is, the highly available the vehicle 50 is for a negawatt DR. Thus, if a DR request is a posiwatt DR, the SOC being low raises the priority of the vehicle 50 for the DR request, and the SOC being high lowers the priority of the vehicle 50 for the DR request. In contrast, if a DR request is a negawatt DR, the SOC being low lowers the priority of the vehicle 50 for the DR request, and the SOC being high raises the priority of the vehicle 50 for the DR request.

"Communication reliability" indicates reliability of wireless communication between the vehicle 50 and the server 30. As mentioned above, as the reliability of communication between the vehicle 50 and the server 30 is degraded, the vehicle 50 may not perform appropriate adjustment of supply and demand of electric power in response to a DR request. Therefore, the degradation of the communication reliability lowers the priority of the vehicle 50 for a DR request. In the present embodiment, the reliability of the communication with the vehicle 50 is determined to be poor if, although the server 30 has sensed changes in SOC of the vehicle 50, the server 30 has not obtained the history information indicating that the vehicle 50 has performed external charging or external electric power supply from the vehicle 50.

FIG. 6 is a diagram illustrating one example of priority information for a DR request. Referring to FIG. 6, the priority information is managed by the server 30, and indicates a priority of each user participating in DR. "UID-*" indicates a user ID of a user (a customer) corresponding to the priority. The priority information is updated based on the DR information for each vehicle shown in FIG. 5**.

Figure 7:
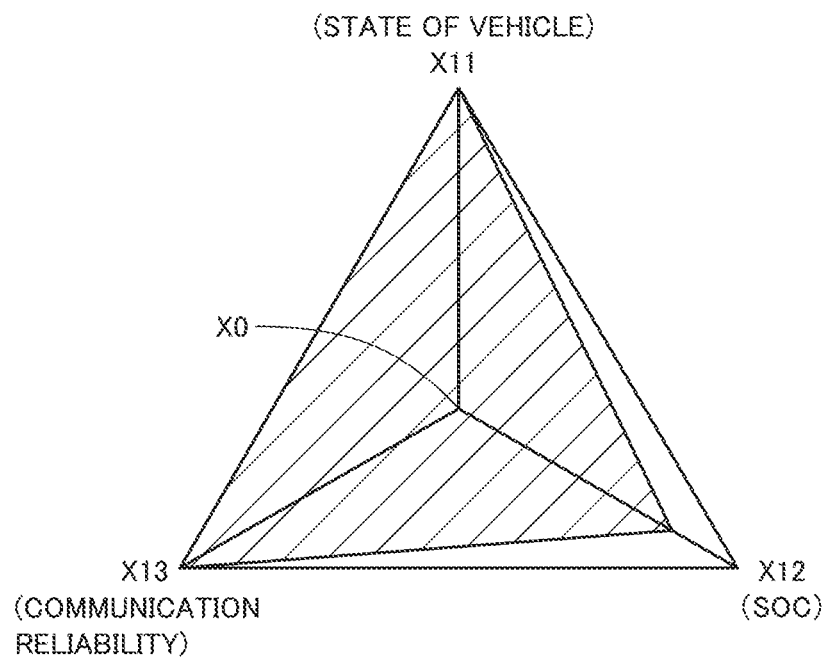
FIG. 7 is a diagram illustrating one example method of determination of priority for a DR request.
Figure 8:
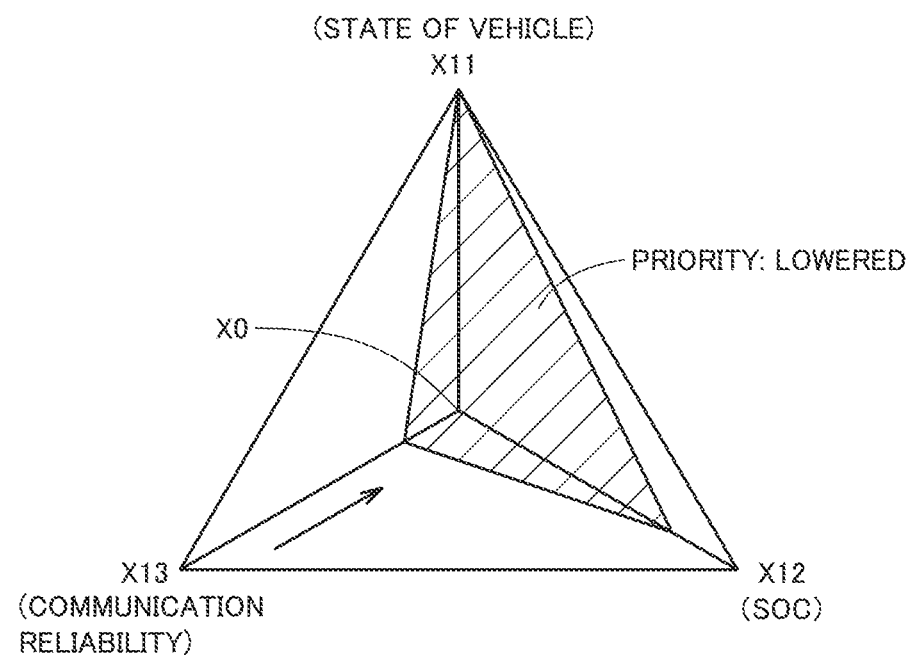
FIG. 8 is a diagram illustrating one example method of determination of priority for a DR request.

FIGS. 7 and 8 are diagrams each illustrating one example method of determination of the priority of the vehicle 50 for a DR request. Referring to FIGS. 5 and 7, X11 to X13 are indices respectively indicating degrees of "state of vehicle," "SOC," and "communication reliability" shown in FIG. 5.

For example, the longer the time period for which the vehicle 50 is available for DR relative to a time period the DR request, a point farther away from the center X0 (outer side), the "state of vehicle" indicated by X11 is plotted to. This example shows that the vehicle 50 is available for DR for an entire period of time for which a DR request is made.

When the DR request is a posiwatt DR, the lower the SOC is, the outer side of the chart the "SOC" indicated by X12 is plotted to. When the DR request is a negawatt DR, the higher the SOC is, the outer side of the chart the "SOC" indicated by X12 is plotted to. The higher the reliability of the communication between the server 30 and the vehicle 50 is determined to be, the outer side of the chart the "communication reliability" indicated by X13 is plotted to. Stated differently, the "communication reliability" indicated by X13 is plotted to the inner side of the chart if the reliability of communication between the server 30 and the vehicle 50 is determined to be low.

Then, in this example, based on the area of the hatched region defined by the plots of X11 to X13, the priority of the vehicle 50 is determined. In other words, as compared to other vehicles, the greater the area of the hatched region, the higher the priority the vehicle 50 has, while the smaller the area of the hatched region, the lower the priority the vehicle 50 has.

FIG. 8 is a diagram illustrating a situation in which the reliability of the communication between the server 30 and the vehicle 50 is degraded. Referring to FIG. 8, in this example, since the reliability of the communication between the server 30 and the vehicle 50 is degraded, "communication reliability" indicated by X13 is plotted to the inner side of the chart, as compared to the example of FIG. 7. Therefore, the area of the hatched region defined by the plots of X11 to X13 is smaller than the example of FIG. 7. In other words, the chart illustrated in FIG. 8 indicates that the vehicle 50 has a lower priority than the example shown in FIG. 7.

The respective indices of X11 to X13 may be weighed. For example, the indices may be weighed so that the degradation of the communication reliability has a greater contribution to lowering the priority than the condition of the SOC has. The parameters determining the priority of the vehicle 50 for a DR request are not limited to X11 to X13, and other parameters may be included.

Figure 9:
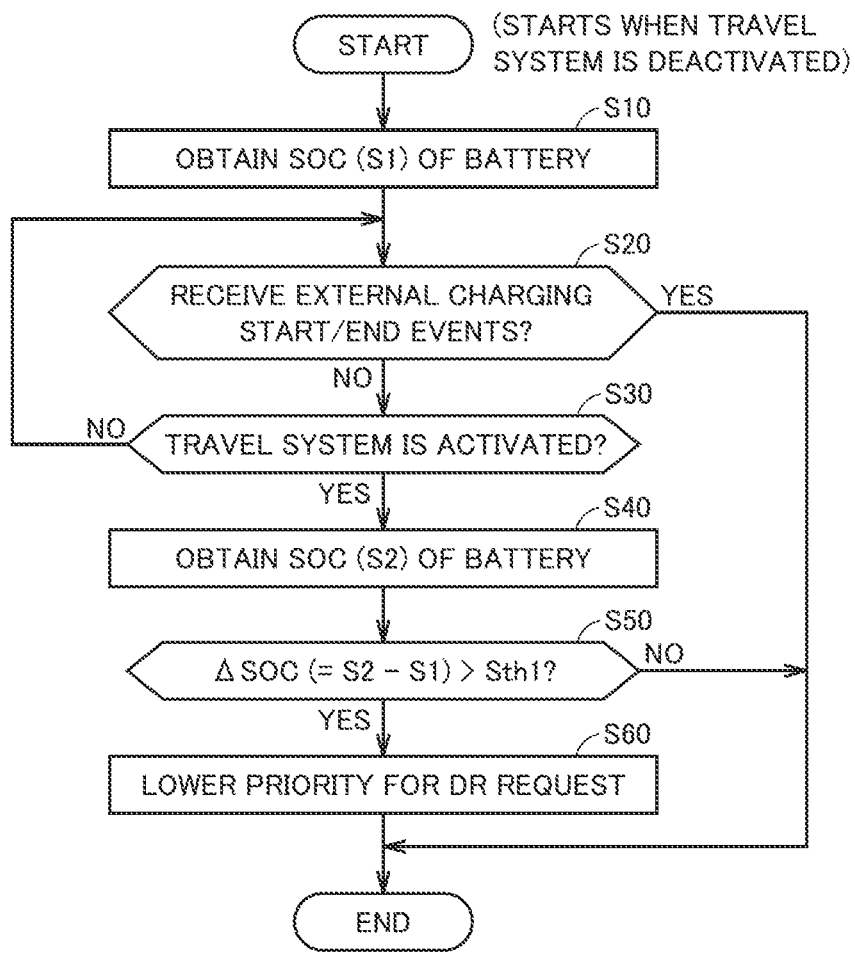
FIG. 9 is a flowchart showing one example procedure of a process of updating the priority of a vehicle for a DR request.
Figure 10:
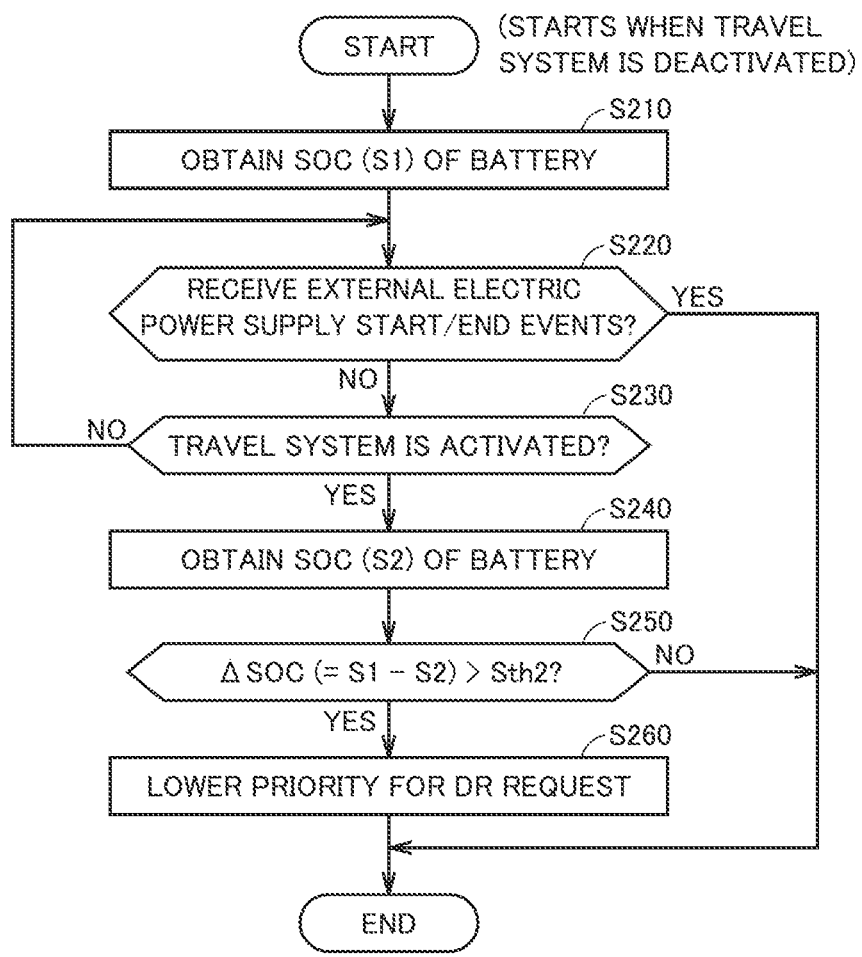
FIG. 10 is a flowchart illustrating one example procedure of a process of updating the priority of a vehicle for a DR request.

FIGS. 9 and 10 are flowcharts each illustrating one example procedure of a process of updating the priority of the vehicle 50 for a DR request. The flowchart of FIG. 9 shows a procedure when a posiwatt DR is requested. The flowchart of FIG. 10 shows a procedure when a negawatt DR is requested. The series of process steps illustrated in these flowcharts are performed by the server 30, and is started once the server 30 obtains the various information (FIG. 3) on the vehicle 50 from the vehicle 50 upon the deactivation of the travel system of the vehicle 50.

Referring to FIG. 9, as the travel system of the vehicle 50 is deactivated, the server 30 obtains the information on the SOC (will be referred to as S1) of the battery 130 from the information (FIG. 3) transmitted from the vehicle 50 (step S10).

Subsequently, the server 30 determines whether the server 30 has received external charging start event and end event from the vehicle 50 (step S20). Specifically, the server 30 determines whether the server 30 has received the information (FIG. 4) indicating that the event type is start and end of external charging from the vehicle 50, after the travel system is deactivated. Upon receiving the external charging start event and end event (YES in step S20), the server 30 passes the process to END, without performing the subsequent process steps.

While the server 30 has not received at least one of the external charging start event and end event from the vehicle 50 (NO in step S20), the server 30 determines whether the travel system of the vehicle 50 is activated (step S30). Specifically, the server 30 determines whether the server 30 has received the various information (FIG. 3) of the vehicle 50 from the vehicle 50 upon deactivation of the travel system. If the server 30 has not yet received the information and the travel system is being deactivated (NO in step S30), the process returns to step S20.

If the travel system of the vehicle 50 is determined to be activated in step S30 (YES in step S30), the server 30 obtains the information on the SOC (will be referred to as S2) of the battery 130 from the information (FIG. 3) transmitted from the vehicle 50 (step S40).

Subsequently, the server 30 calculates a difference $\Delta SOC$ ($=S2-S1$) between the SOC (S2) obtained in step S40 and the SOC (S2) obtained in step S10, and determines whether $\Delta SOC$ is greater than a threshold Sth1 (step S50). It should be noted that, since an average amount of increase in SOC during external charging is considered as being sufficiently greater than an amount of increase in SOC while the vehicle is traveling (in general, the SOC decreases while the vehicle is traveling), the threshold Sth1 is appropriately set to a value that allows the SOCs in the above two cases to be distinguishable.

Then, if $\Delta SOC$ is determined to be greater than the threshold Sth in step S50 (YES in step S50), the server 30 updates, by lowering, the priority of the vehicle 50 for the DR request (posiwatt DR) (step S60). Specifically, if the server 30 has not received at least one of the external charging start event and end event from the vehicle 50 (NO in step S20) although $\Delta SOC$ is greater than the threshold Sth1 (YES in step S50), such a situation is determined as the reliability of communication being degraded between the server 30 and the vehicle 50. Then, the server 30 updates, by lowering, the priority of the vehicle 50 for the DR request (posiwatt DR), based on the area of the hatched region defined by the plots of X11 to X13, as described with respect to FIGS. 7 and 8.

While, in the above description, the case where the server 30 has not received at least one of the external charging start event and end event from the vehicle 50 is the condition under which the priority of the vehicle 50 is lowered, it should be noted that the condition may be that the server 30 has not received both the external charging start event and end event from the vehicle 50.

The weight on the communication reliability in determination of the priority may be changed, depending on whether the server 30 has not received both the external charging start event and end event or one of both events.

Referring to FIG. 10, a procedure when a negawatt DR is requested is now described. The process steps S210, S230, S240, and S260 in the flowchart illustrated in FIG. 10 are the same as the process steps S10, S30, S40, and S60, respectively, illustrated in FIG. 9.

In the flowchart, if obtained the information on the SOC (S1) of the battery 130 in step S210, the server 30 determines whether the server 30 has received external electric power supply start event and end event from the vehicle 50 (step S220). Specifically, after the travel system is deactivated, the server 30 determines whether the server 30 has received from the vehicle 50 the information (FIG. 4) indicating that the event type is start and end of the external electric power supply. Then, if the server 30 receives the external electric power supply start event and end event (YES in step S220), the server 30 passes the process to END, without performing the subsequent process steps.

As long as the server 30 has not received at least one of the external electric power supply start event and end event from the vehicle 50 (NO in step S220), the server 30 passes the process to step S230.

If obtained the information on the SOC (S2) of the battery 130 in step S240, the server 30 calculates a difference ΔSOC (=S1−S2) between the SOC (S1) obtained in step S210 and the SOC (S2) obtained in step S240, and determines whether ΔSOC is greater than a threshold Sth2 (step S250).

Then, if ΔSOC is determined to be greater than the threshold Sth2 in step S250 (YES in step S250), the process is passed to step S260 in which the priority of the vehicle 50 for the DR request (negawatt DR) is updated by being lowered. Specifically, if the server 30 has not received at least one of the external electric power supply start event and end event from the vehicle 50 (NO in step S220) although ΔSOC is greater than the threshold Sth2 (YES in step S250), such a situation is determined as the reliability of communication being degraded between the server 30 and the vehicle 50. Then, the server 30 updates, by lowering, the priority of the vehicle 50 for the DR request (negawatt DR), based on the area of the hatched region defined by the plots of X11 to X13, as described with respect to FIGS. 7 and 8.

It should be noted that, since an average amount of decrease in SOC during external electric power supply is considered as being greater than an amount of decrease in SOC while the vehicle is traveling (because electric power is discharged and charged while the vehicle is traveling), the threshold Sth2 is appropriately set to a value that allows average amounts of change in the SOCs in the above two cases to be distinguishable, for example.

While, in the example of FIG. 10, the case where the server 30 has not received at least one of the external electric power supply start event and end event from the vehicle 50 is the condition under which the priority of the vehicle 50 is lowered, it should be noted that the condition may be that the server 30 has not received both the external electric power supply start event and end event from the vehicle 50.

The weight that is applied to the communication reliability when determining the priority may be changed, depending on whether the server 30 has not received both the external electric power supply start event and end event or one of both events.

As described above, in the present embodiment, if the server 30 has not obtained, even though the SOC of the battery 130 of the vehicle 50 has changed, the history information indicating that the vehicle 50 has performed external charging or external electric power supply, the reliability of wireless communications between the server 30 and the vehicle 50 is considered as being degraded, and the priority of the vehicle 50 is determined so that the vehicle 50 is less likely to be selected for a DR request. This can avoid a situation in which, despite the fact that the vehicle 50 is participating in DR, no appropriate adjustment of supply and demand of electric power is performed in response to a DR request due to the degradation of the communication reliability. Therefore, according to the present embodiment, a customer (the user of the vehicle 50) can be prevented from suffering from drawbacks (such as being subjected to penalty) caused by appropriate adjustment of supply and demand of electric power not being performed in response to a DR request.

[Variation 1]

The embodiment above has been described with reference to using the information indicating the start/end of external charging or external electric power supply as the history information indicating that the vehicle 50 has performed demand and supply of electric power for the power grid PG, that is, the history information indicating that the vehicle 50 has performed the external charging or the external electric power supply. Information indicating connection/disconnection between the connector 43 of the electric power cable 42 and the inlet 110 may instead be used as the history information above.

Figure 11:
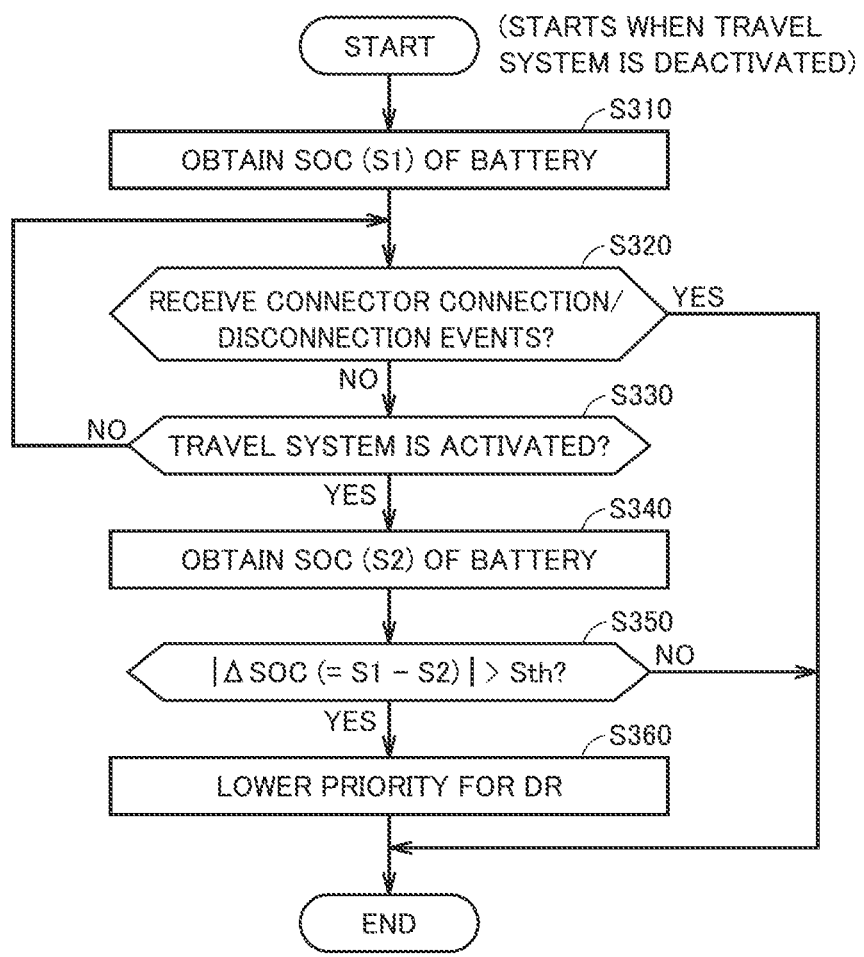
FIG. 11 is a flowchart illustrating one example procedure of a process of updating the priority of a vehicle for a DR request, according to Variation 1.

FIG. 11 is a flowchart illustrating one example procedure of a process of updating the priority of the vehicle 50 for a DR request, according to Variation 1. The flowchart corresponds to the flowcharts illustrated in FIGS. 9 and 10.

Referring to FIG. 11, the process steps S310, S330, S340, and S360 illustrated in the flowchart are the same as the process steps S10, S30, S40, S60, respectively, illustrated in FIG. 9.

In the flowchart, if obtained the information on the SOC (S1) of the battery 130 in step S310, the server 30 determines whether the server 30 has received from the vehicle 50 a connect event and a disconnect event between the connector 43 of the electric power cable 42 and the inlet 110 (step S320). Specifically, after the travel system is deactivated, the server 30 determines whether the server 30 has received from the vehicle 50 the information (FIG. 4) indicating that the event type is connection and disconnection between the connector 43 and the inlet 110. Then, upon receiving a connect event and a disconnect event between the connector 43 and the inlet 110 (YES in step S320), the server 30 passes the process to END, without performing the subsequent process steps.

If the server 30 has not received at least one of a connect event and a disconnect event between the connector 43 and the inlet 110 from the vehicle 50 (NO in step S320), the server 30 passes the process to step S330.

If obtained the information on the SOC (S2) of the battery 130 in step S340, the server 30 calculates a difference |ΔSOC| between the SOC (S1) obtained in step 310 and the SOC (S2) obtained in step S340, and determines whether |ΔSOC| is greater than a threshold Sth (step S350).

Then, if |ΔSOC| is determined to be greater than the threshold Sth in step S350 (YES in step S350), the process is passed to step S360 in which the priority of the vehicle 50 for the DR request is updated by being lowered. Specifically, if the server 30 has not received at least one of a connect event and a disconnect event between the connector 43 and the inlet 110 from the vehicle 50 (NO in step S320) although |ΔSOC| is greater than the threshold Sth (YES in step S350), such a situation is determined as the reliability of communication being degraded between the server 30 and the vehicle 50. Then, the server 30 updates, by lowering, the priority of the vehicle 50 for the DR request, based on the area of the hatched region defined by the plots of X11 to X13, as described with respect to FIGS. 7 and 8.

As described above, Variation 1 yields the same advantages effects as the embodiment above.

[Variation 2]

While the embodiment above and Variation 1 have been described with reference to using a change in SOC (ΔSOC) since the travel system is deactivated until the travel system is next activated in order to determine the reliability of communication between the server 30 and the vehicle 50, a change in SOC when the location of the vehicle 50 remains unchanged may instead be used.

Figure 12:
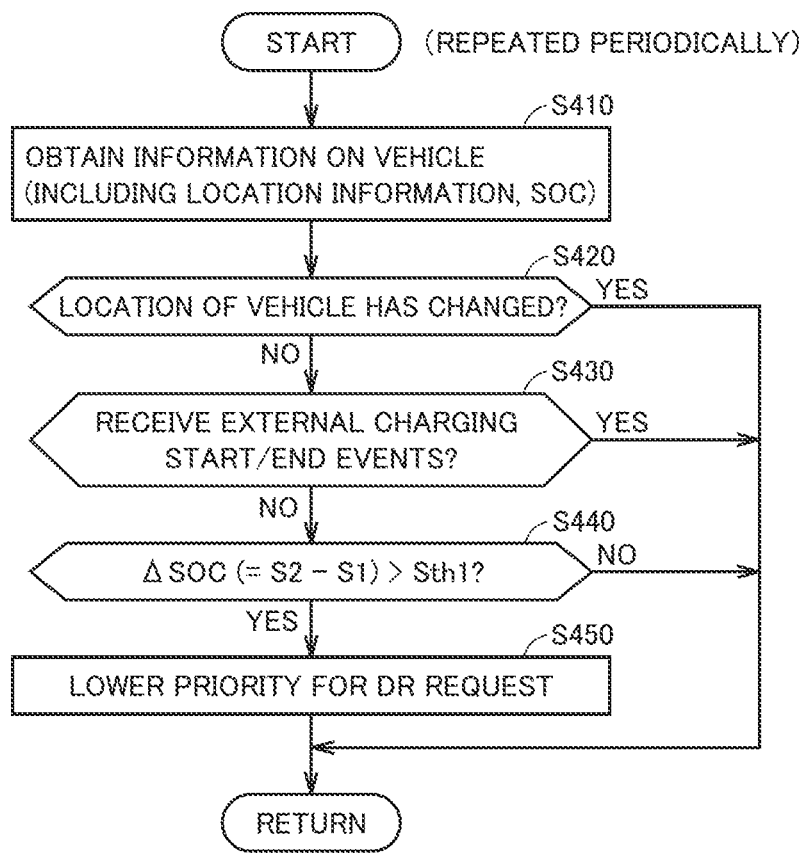
FIG. 12 is a flowchart illustrating one example procedure of a process of updating the priority of a vehicle for a DR request, according to Variation 2.

FIG. 12 is a flowchart illustrating one example procedure of a process of updating the priority of the vehicle 50 for the DR request, according to Variation 2. The flowchart illustrates a procedure when a posiwatt DR is requested. The series of process steps illustrated in the flowchart is repeated at prescribed cycles.

Referring to FIG. 12, the server 30 obtains the information on the vehicle 50 (the location information, the SOC of the battery 130, etc.) from the information (FIG. 4) that is periodically transmitted from the vehicle 50 (step S410). The server 30 then determines whether the location information on the vehicle 50, obtained in step S410, has changed from the previous values (step S420). If the location of the vehicle has changed (YES in step S420), the process is passed to RETURN, without the subsequent series of process steps being performed.

If the location of the vehicle remains unchanged (NO in step S420), the server 30 determines whether the server 30 has received external charging start event and end event from the vehicle 50 (step S430). If the server 30 has received the external charging start event and end event (YES in step S430), the server 30 passes the process to RETURN, without performing the subsequent process steps.

If the server 30 has not received at least one of the external charging start event and end event from the vehicle 50 (NO in step S430), the server 30 calculates a difference ΔSOC (=S2−S1) between the current value (will be referred to as S2), obtained in step S410, and the previous value (will be referred to as S1) of the SOC, and determines whether ΔSOC is greater than a threshold Sth1 (step S440).

Then, if the ΔSOC is determined to be greater than the threshold Sth1 in step S440 (YES in step S440), the server 30 updates, by lowering, the priority of the vehicle 50 for the DR request (posiwatt DR) (step S450). Specifically, if the server 30 has not received at least one of the external charging start event and end event from the vehicle 50 (NO in step S430) although the SOC has changed (ΔSOC>Sth1) (YES in step S440) while the vehicle 50 is being parked (the location information remains unchanged), such a situation is determined as the reliability of communication being degraded between the server 30 and the vehicle 50. Then, the server 30 updates, by lowering, the priority of the vehicle 50 for the DR request (posiwatt DR), based on the area of the hatched region defined by the plots of X11 to X13, as described with respect to FIGS. 7 and 8.

Note that, although not shown particularly, for a procedure when a negawatt DR is requested, the priority of the vehicle 50 for the DR request (negawatt DR) is updated by determining whether the server 30 has received external electric power supply start/end events in step S430, and determining whether ΔSOC=S1 (previous value)−S2 (current value) is greater than the threshold Sth1 in step S440.

As described above, Variation 2 also yields the same advantages effects as the embodiment above.

[Variation 3]

Similarly to Variation 1 of the present embodiment, in Variation 2, information indicating connection/disconnection between the connector 43 of the electric power cable 42 and the inlet 110 may be used as the history information indicating that the vehicle has performed external charging or external electric power supply.

Figure 13:
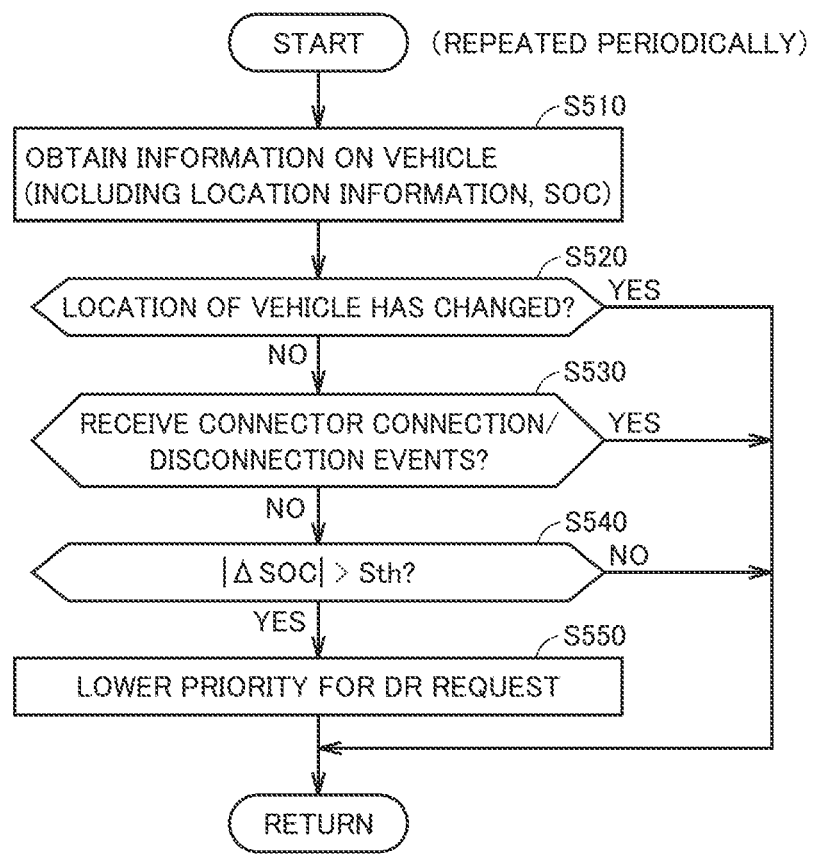
FIG. 13 is a flowchart illustrating one example procedure of a process of updating the priority of a vehicle for a DR request, according to Variation 3.

FIG. 13 is a flowchart illustrating one example procedure of a process of updating the priority of the vehicle 50 for a DR request, according to Variation 3. The flowchart corresponds to the flowchart illustrated in FIG. 12.

Referring to FIG. 13, the process steps S510, S520, and S550 illustrated in the flowchart are the same as the process steps S410, S420, and S450, respectively, illustrated in FIG. 12.

In the flowchart, if the location of the vehicle remains unchanged (NO in step S520), the server 30 determines whether the server 30 has received from the vehicle 50 a connect event and a disconnect event between the connector 43 of the electric power cable 42 and the inlet 110 (step S530). Specifically, the server 30 determines whether the server 30 has received from the vehicle 50 the information (FIG. 4) indicating that the event type is connection and disconnection between the connector 43 and the inlet 110. Then, upon receiving a connect event and a disconnect event between the connector 43 and the inlet 110 (YES in step S530), the server 30 passes the process to RETURN, without performing the subsequent process steps.

If the server 30 has not received at least one of a connect event and a disconnect event between the connector 43 and the inlet 110 from the vehicle 50 (NO in step S530), the server 30 calculates a difference |ΔSOC| between the current value of the SOC obtained in step S510 and the previous value, and determines whether |ΔSOC| is greater than a threshold Sth (step S540).

Then, if |ΔSOC| is determined to be greater than the threshold Sth in step S540 (YES in step S540), the process is passed to step S550, and the priority of the vehicle 50 for the DR request is updated by being lowered.

As described above, Variation 3 also yields the same advantages effects as the embodiment above.

[Variation 4]

While Variations 2 and 3 have been described, with reference to using changes in SOC (ΔSOC) when the location of the vehicle remains unchanged in order to determine the reliability of communication between the server 30 and the vehicle 50, a change in travel distance of the vehicle 50 may instead be used.

Figure 14:
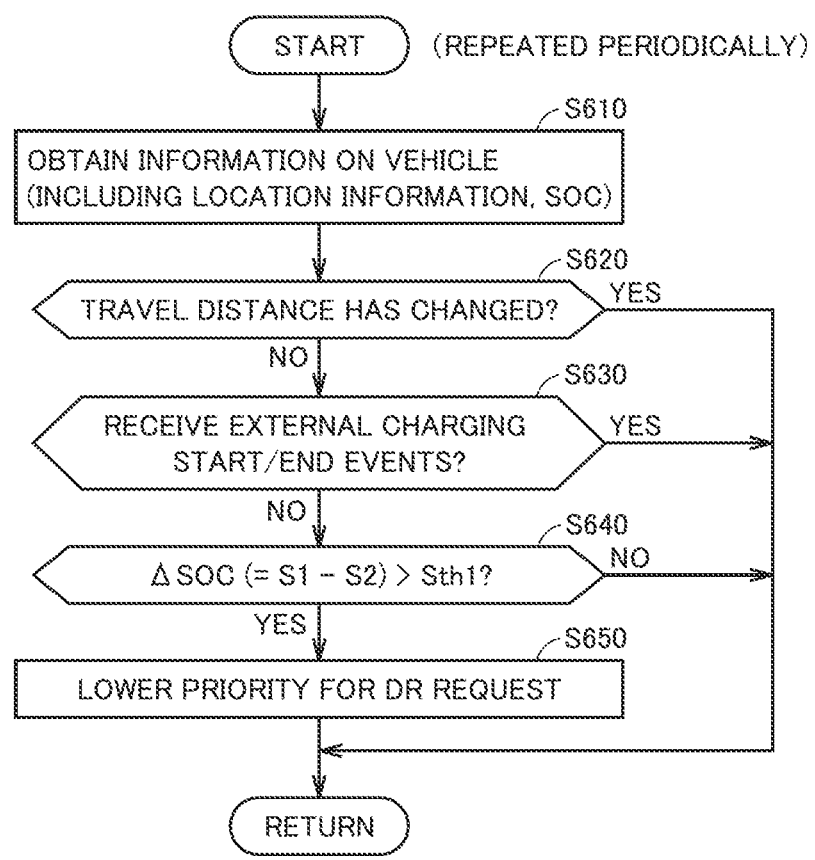
FIG. 14 is a flowchart illustrating one example procedure of a process of updating the priority of a vehicle for a DR request, according to Variation 4.

FIG. 14 is a flowchart illustrating one example procedure of a process of updating the priority of the vehicle 50 for a DR request, according to Variation 4. The flowchart illustrates a procedure when a posiwatt DR is requested. The flowchart corresponds to the flowchart illustrated in FIG. 12.

Referring to FIG. 14, the process steps S610, S630 to S650 illustrated in the flowchart are the same as the process steps S410, S430 to S450, respectively, illustrated in FIG. 12.

In the flowchart, as the server 30, in step S610, obtains the information on the vehicle 50 (including the location information, the SOC, the travel distance, etc.) from the information (FIG. 4) that is periodically transmitted from the vehicle 50, the server 30 determines whether the travel distance of the vehicle 50 has changed from the previous value (step S620). If the travel distance has changed (YES in step S620), the process is passed to RETURN, without the subsequent series of process steps being performed.

If the travel distance remains unchanged (NO in step S620), the server 30 passes the process to step S630 in which the server 30 determines whether the server 30 has received external charging start event and end event from the vehicle 50. The subsequent process steps are the same as those illustrated in FIG. 12.

Note that, although not shown particularly, for a procedure when a negawatt DR is requested, the priority of the vehicle 50 for the DR request (negawatt DR) is updated by determining whether the server 30 has received external electric power supply start/end events in step S630, and determining whether ΔSOC=S1 (previous value)−S2 (current value) is greater than the threshold Sth1 in step S640. In step S630, the server 30 may determine whether the server 30 has received connect/disconnect events between the connector 43 of the electric power cable 42 and the inlet 110, instead of determining whether the server 30 has received the external charging start/end events.

As described above, Variation 4 also yields the same advantages effects as the embodiment above.

The presently disclosed embodiment and the variations thereof should be considered in all aspects as illustrative and not restrictive. The technical scope of the present disclosure is indicated by the appended claims, rather than by the embodiments above, and all changes that come within the scope of the claims and the meaning and range of equivalency of the claims are intended to be embraced within their scope.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power management apparatus for managing a demand response which requests a plurality of power adjustment resources, electrically connectable to a power network, to perform adjustment of supply and demand of electric power for the power network, the plurality of power adjustment resources including a vehicle on which a battery is mounted, the power management apparatus, comprising:
    a communication apparatus that wirelessly communicates with the vehicle;
    an acquisition unit that obtains, from the vehicle through the communication apparatus, history information indicating that the demand and supply of electric power has been performed for the power network, and information on a state of charge of the battery; and
    a control unit that determines priorities of the plurality of power adjustment resources for a request for the demand response, wherein
    when the acquisition unit has not obtained the history information even though the state of charge, obtained by the acquisition unit, has changed, the control unit determines a priority of the vehicle so that the vehicle is less likely to be selected for the request for the demand response.

2. The power management apparatus according to claim 1, wherein the history information includes information indicating at least one of start and end of changing of the battery from the power network.

3. The power management apparatus according to claim 1, wherein the history information includes information indicating at least one of start and end of discharging of electric power from the battery to the power network.

4. The power management apparatus according to claim 1, wherein the history information includes information indicating at least one of electrical connection and electrical disconnection between the power network and the vehicle.

5. The power management apparatus according to claim 1, wherein a change in the state of charge is a change since deactivation of a travel system of the vehicle until activation of the travel system of the vehicle.

6. The power management apparatus according to claim 1, wherein the acquisition unit further obtains location information of the vehicle from the vehicle, and a change in the state of charge is a change when the location information is constant.

7. The power management apparatus according to claim 1, wherein the acquisition unit further obtains a travel distance of the vehicle from the vehicle, and a change in the state of charge is a change when the travel distance is constant.

8. The power management apparatus according to claim 1, wherein when an amount of change in the state of charge, obtained by the acquisition unit, exceeds a threshold and the acquisition unit has not obtained the history information, the control unit determines the priority of the vehicle so that the vehicle is less likely to be selected for the request for the demand response.

9. The power management apparatus according to claim 1, wherein the history information includes information indicating that the battery has been charged from the power network, and
    when the acquisition unit has not obtained the history information even though the state of charge, obtained by the acquisition unit, has risen, the control unit determines the priority of the vehicle so that the vehicle is less likely to be selected for the request for the demand response.

10. A power management method for managing a demand response which requests a plurality of power adjustment resources, electrically connectable to a power network, to perform adjustment of supply and demand of electric power for the power network, the plurality of power adjustment resources including a vehicle on which a battery is mounted, the power management method, comprising:
    wirelessly transmitting, from the vehicle to a server, history information indicating that the demand and supply of electric power has been performed for the power network;
    wirelessly transmitting, from the vehicle to the server, information on a state of charge of the battery; and
    determining priorities of the plurality of power adjustment resources for a request for the demand response, wherein
    determining the priorities includes
    determining a priority of the vehicle so that the vehicle is less likely to be selected for the request for the demand response, when the server has not obtained the history information even though the state of charge, obtained by the server, has changed.

* * * * *